Patented Dec. 29, 1936

2,065,710

UNITED STATES PATENT OFFICE 2,065,710

VAT DYESTUFFS OF THE PYRENEQUINONE SERIES AND PROCESS OF MAKING SAME

Walter Kern, Sissach, Switzerland, assignor to the firm of Society of Chemical Industry in Basle, Basel, Switzerland No Drawing. Application June 29, 1935, Serial No. 29,169. In Switzerland July 7, 1934

22 Claims. (Cl. 260—56)

This invention consists in the manufacture of vat-dyestuffs by causing halogenating agents to react in a first step with pyrenequinone, and then causing amines containing at the nitrogen atom at least one exchangeable hydrogen atom to react, in a second step, with the halogenated pyrenequinone having a melting point above 330° C.

The halogenating agent may be, for example, a chlorinating or brominating agent, for instance chlorine, sulphuryl chloride or bromine.

The halogenation is preferably conducted in the presence of a solvent or suspension agent, for instance water, glacial acetic acid, benzene, chlorobenzene, trichlorobenzene, chloronaphthalene, nitrobenzene, tetrachlorethane, chloroform, sulfuric acid or chlorosulfonic acid; in many cases it is of advantage that a halogen carrier should be present, for instance iodine, iron or salt of iron, zinc chloride or antimony pentachloride.

In accord with the proportion of the halogenating agent used and the temperature and duration of the treatment, the pyrenequinone may be converted into the mono-, di-, tri- or even more highly halogenated pyrenequinones; for instance, tetrahalogenpyrenequinones. The manufacture of the more highly halogenated products occurs best in the presence of a halogen carrier.

The halogenpyrenequinones produced, which have a melting point above 330° C., are valuable intermediate products.

The amines which contain at the nitrogen atom at least one hydrogen atom capable of exchange, and which are caused to react with the halogenated pyrenequinones of a melting point above 330° C., may for example belong to the aliphatic, aromatic or hydroaromatic series. As instances of such compounds there may be named: hydrazines, hydroxylamine, alkylamine, such as monomethylamine and diethylamine or ethanolamine, whose hydroxyl-groups may be etherified; arylamines as well as arylsulfamides, such as for example aminobenzenes, phenylenediamines, benzidine, cyclohexylamine, monoethylaminobenzenes, aminonaphthalenes, tetrahydroaminonaphthalenes, aminoanthracenes, aminochrysenes, aminocarbazoles, aminopyrenes, aminobenzophenones, toluenesulfamides, as well as the substitution products of these substances which may for instance contain halogens, nitro-, alkoxy- or alkylmercapto-groups. As amines there may further also be used such amino-compounds in which the amino-group or groups belong to a vatable radical. Such products are for example aminoanthraquinones, aminopyranthrones, aminoanthanthrones or aminodibenzanthrones, as well as the derivatives thereof substitued by the most various substituents, such as for example halogen or benzoylamino-groups.

The reaction of the halogenpyrenequinones with one or several, among themselves identical or different amines, may occur in the absence or in the presence of an organic solvent or suspension agent, such as amylalcohol, nitrobenzene, tetrachlorethane, chloronaphthalene, benzene, trichlorobenzene, pyridine and also in presence of an agent that binds acid, for instance sodium acetate or potassium carbonate, with or without addition of a substance which facilitates the exchange of halogen, for example copper, a compound of copper or sulfur.

The dyestuffs thus obtained may in many cases also serve as intermediate products for the manufacture of further dyestuffs.

The dyestuffs obtainable by this invention may be purified by crystallization or by conversion into their salts formed with strong acids, or by treatment with an oxidizing agent, for instance alkali-hypochlorite solution; they may be converted by known methods into their leuco-derivatives, for instance into leuco-sulfuric acid esters.

They are valuable vat-dyestuffs and may be used for dyeing and printing vegetable fibres, for instance cotton; the dyeings and printings produced are very fast.

The following examples illustrate the invention, the parts being by weight unless otherwise stated: the relation between parts by weight and parts by volume being that which exists between the kilo and the litre:—

Example 1

69 parts of pyrenequinone are dissolved in 500 parts by volume of concentrated sulfuric acid and, in the course of 1 hour, 192 parts of bromine are dropped into the solution at 20–25° C. The temperature is then raised to 40–45° C. and the solution is stirred for 12 hours. After cooling, ice and water are added, and the precipitated tetrabromopyrenequinone is filtered, washed and dried. For purification the crude product is recrystallized from tetrachlorethane, whereby orange to red needles are obtained of melting point 350–355° C.; they dissolve in concentrated sulfuric acid to an orange brown solution. The tetrabromopyrenequinone yields a golden-yellow vat, from which the tetrabromopyrenequinone may be reprecipitated by oxidation, for example with air.

Example 2

138 parts of pyrenequinone are suspended in 1400 parts of trichlorobenzene and chlorine is passed into the suspension for 4 hours at 130–135° C. The mass is then distilled in steam to remove the trichlorobenzene. The residue is a red-brown product, which when filtered, washed and dried melts above 350° C. It can be recrystallized from nitrobenzene. The new chloropyrenequinone is an orange-brown powder, soluble in concentrated sulfuric acid to a brown solution and yielding an orange-yellow vat. Its content of chlorine is about 24.6 per cent.; that of dichloropyrenequinone being 23.6 per cent.

Example 3

138 parts of pyrenequinone are suspended in 1400 parts of trichlorobenzene and chlorine is passed into the suspension for 2 hours at 185–190° C.; for separating the trichlorobenzene the mass is distilled in steam and the crude product, which is obtained in good yield, is recrystallized from nitrobenzene; it forms orange-brown needles, the chlorine content of which corresponds with that of the trichloropyrenequinone. It dissolves in concentrated sulfuric acid to a brown solution and yields with sodium hydrosulfite and caustic soda solution a yellow-orange vat.

A like product is obtained when some iodine is added to the mass undergoing reaction and the temperature is not allowed to rise above 130° C.

Example 4

138 parts of pyrenequinone are suspended in 1400 parts of trichlorobenzene, some iodine is added and chlorine is passed into the suspension for 6 hours at 180–185° C. On cooling, a portion of the tetrachloropyrenequinone crystallizes and is removed by filtration. After steam-distilling the trichlorobenzene a further quantity of tetrachloropyrenequinone can be obtained from the residue. Recrystallization from nitrobenzene yields orange-red needles which melt at 333° C. and dissolve in concentrated sulfuric acid to a brown solution; they yield a bright yellow vat.

Example 5

138 parts of pyrenequinone are suspended in 1200 parts of trichlorobenzene, some iodine is added and during 20 hours 800 parts of chlorine are introduced into the suspension, the temperature of which is 160–165° C. After cooling, the tetrachloropyrenequinone separates in the form of brown-orange needles which can be isolated by simple filtration. After recrystallization from nitrobenzene there is obtained a good yield of small brown-orange needles which melt at 362° C. They dissolve in concentrated sulfuric acid to a brown solution and yield a dark yellow vat.

Example 6

103.5 parts of pyrenequinone are suspended in 900 parts of trichlorobenzene, some iodine is added and at 160–165° C. chlorine is introduced into the mass during 4 hours. The temperature is now raised to 180–185° C. and introduction of chlorine continued until a sample recrystallized from nitrobenzene melts at 350° C., which is the case after about 2 hours. The mass is then allowed to cool to 70° C. and then filtered. The crude tetrachloropyrenequinone may be recrystallized from nitrobenzene, in the form of orange-brown crystals which melt at 350° C. They dissolve in concentrated sulfuric acid to a brown solution and yield a bright yellow vat.

Example 7

28 parts of tetrabromopyrenequinone of melting point 350–355° C., 10 parts of aniline and a small quantity of very pure finely divided copper are suspended in 300 parts of tetrachlorethane and 20 parts of anhydrous sodium acetate are added for binding acid. The whole is then heated for 18 hours to 120–125° C. After cooling and filtering the product remains on the filter in good yield in the form of a dark blue, crystalline powder. This may be recrystallized from tetrachlorethane in the form of violet crystals which melt at 325° C. and dissolve in concentrated sulfuric acid to a grey-brown solution; in a yellow-orange vat the product dyes cotton fast grey-green tints.

A similar product can be obtained without the addition of very pure finely divided copper.

Example 8

28 parts of tetrabromopyrenequinone of melting point 350–355° C. are mixed with 600 parts of aniline and some very pure finely divided copper and the mixture is stirred for 4 days at the ordinary temperature. It is then diluted with alcohol, filtered and the solid matter washed and dried. The grey-blue product obtained in a good yield, dissolves in concentrated sulfuric acid to a grey-brown solution and dyes cotton in a yellow-brown vat fast green olive tints.

Example 9

37 parts of tetrachloropyrenequinone of melting point 338° C., 60 parts of aniline and some very pure finely divided copper are suspended in 300 parts of tetrachlorethane and 30 parts of anhydrous sodium acetate are added. The mixture is heated, while stirring, for 24 hours at 120–125° C. After cooling, the mass is filtered and the solid matter washed with a little alcohol and dried. The dyestuff thus obtained is a violet powder which melts at about 305° C., dissolves in concentrated sulfuric acid to an olive green solution and dyes cotton in a green-yellow vat fast blue tints.

If the operation is conducted without the addition of copper the dyestuff obtained dissolves in concentrated sulfuric acid to a dirty red solution and dies cotton in a yellow vat brown-yellow tints.

Example 10

18.5 parts of tetrachloropyrenequinone of melting point 338° C. are mixed with 200 parts of aniline, some very pure finely divided copper is added and the mixture is stirred for 4 days at the ordinary temperature. The mass is then filtered and the solid matter washed with alcohol, water and again with alcohol and then dried. The product is a violet black powder which melts at about 250° C. It dissolves in concentrated sulfuric acid to a grey-brown solution and dyes cotton in a yellow-brown vat olive-grey tints.

If copper is omitted from the reaction a dyestuff is obtained which dissolves in concentrated sulfuric acid to a dirty red solution and dyes cotton brown in a yellow vat.

Example 11

37 parts of tetrachloropyrenequinone of melting point 355° C., 40 parts of aniline and some very pure finely divided copper are suspended in 300 parts by volume of tetrachlorethane and 30 parts of potassium carbonate are added. The mixture is heated while stirring well for 24 hours at 120–125° C. After cooling and filtering, the solid matter is washed with alcohol and water, whereby it becomes a green-black powder. When recrystallized from chlorobenzene it forms grey-green hair-like needles, which melt at 295–300° C. and dissolve in concentrated sulfuric acid to an olive-green solution. It dyes cotton grey-green tints in a golden-yellow vat. Its content of chlorine is about 31.8 per cent; that of nitrogen 3.36 per cent; from which it may be supposed that it is an aniline-tetrachloropyrenequinone.

Example 12

37 parts of tetrachloropyrenequinone of melting point 345° C., 600 parts by volume of aniline and some very pure finely divided copper are mixed together, and for 20 hours the mixture is stirred at a temperature of 90–95° C. After cooling, the mass is filtered and the solid matter washed with alcohol and water to remove impurities. By recrystallization from nitrobenzene there are obtained dull brown-violet needles which dissolve sparingly in the usual solvents. In concentrated sulfuric acid the product dissolves to a blue solution; it dyes cotton violet-brown tints of good fastness. The content of chlorine is about 13.5 per cent and that of nitrogen about 7.3 per cent.

Example 13

37 parts of tetrachloropyrenequinone of melting point 362° C. and some very pure finely divided copper are mixed with 600 parts of para-anisidine and for 24 hours the mixture is stirred, at 90–95° C. The dark-coloured mass is diluted with chlorobenzene and filtered. The solid matter is purified by washing with alcohol and water, whereby crystals of metallic lustre are obtained in good yield and may be further purified by recrystallization from nitrobenzene. In this manner small needles having a blue shimmer are obtained which dissolve in concentrated sulfuric acid to a cornflower blue solution and dye cotton in an orange yellow vat brown-violet tints of good fastness.

Example 14

500 parts of β-naphthylamine, 37 parts of tetrachloropyrenequinone of melting point 350° C. and some very pure finely divided copper are together heated to 125–130° C. and maintained at this temperature for 20 hours. At the end of the reaction the hot mass is diluted with 600 parts by volume of chlorobenzene and then filtered, the solid matter being washed with alcohol and dried. The dyestuff thus obtained is a violet powder, soluble in concentrated sulfuric acid to a blue-violet solution. By recrystallization from nitrobenzene there are obtained needles which melt above 380° C. and dye cotton brown-violet tints of good fastness.

Example 15

70 parts of β-naphthylamine, 37 parts of tetrachloropyrenequinone of melting point 350° C., 30 parts of potassium carbonate and a little very pure finely divided copper are together suspended in 350 parts by volume of tetrachlorethane and the suspension is heated for 20 hours to 120–125° C. while stirring. After cooling, the solid matter is filtered, washed and dried. The dyestuff, which is obtained in good yield is a green-black powder. After recrystallization from chlorobenzene it melts at 283–285° C. and dissolves in concentrated sulfuric acid to a red-brown solution. In an orange vat it dyes cotton olive tints of very good fastness.

A like dyestuff is obtained by using trichlorobenzene instead of tetrachlorethane, in which case the potassium carbonate may be omitted.

Example 16

40 parts of aniline, 37 parts of tetrachloropyrenequinone of melting point 345° C., 30 parts of potassium carbonate and some very pure finely divided copper are together suspended in 300 parts by volume of tetrachlorethane and the suspension is heated in an autoclave for 16 hours to 150–155° C., while stirring. After cooling, the contents of the autoclave are filtered and the solid matter is washed with tetrachlorethane, alcohol and water and dried. The product obtained in very good yield is a black-brown powder which melts above 360° C. It dissolves in concentrated sulfuric acid to a dirty violet-grey color and dyes cotton in a yellow vat olive-black tints of good fastness. Its content of chlorine amounts to about 22.5 per cent. and of nitrogen 4.3 per cent. A like product is obtained when the operation is conducted without copper.

Example 17

40 parts of aniline, 37 parts of tetrachloropyrenequinone of melting point 350° C. and some very pure finely divided copper are together suspended in 300 parts by volume of tetrachlorethane and 30 parts of potassium carbonate are added. The mixture is heated, while stirring, for 24 hours at 120–125° C. After cooling and filtering the solid matter is washed with alcohol, water and again with alcohol and dried. The dyestuff obtained in good yield is a dark grey-green powder; by recrystallization from chlorobenzene it is obtained in the form of hair-like needles of melting point 285–290° C.; it dissolves in concentrated sulfuric acid to an olive green solution and dyes cotton in a yellow vat green tints.

Example 18

600 parts of 2:5-dichloraniline, 37 parts of tetrachloropyrenequinone of melting point 350° C. and a little very pure finely divided copper are together kept for 20 hours at 140–145° C. while stirring. The still hot melt is mixed with 500 parts by volume of chlorobenzene and then filtered, the solid matter being washed and dried. The product is a black-grey powder which may be obtained in the form of dark needles which decompose at 330° C. by recrystallization from nitrobenzene. The dyestuff dissolves in concentrated sulfuric acid to a dirty green solution and dyes cotton olive-black tints of good fastness to washing.

Example 19

45 parts of ortho-dianisidine, 18.5 parts of tetrachloropyrenequinone of melting point 360° C. and a little very pure finely divided copper are together suspended in 250 parts of trichlorobenzene and the suspension is stirred for 20 hours at a temperature of 120–128° C. The solid product is filtered, dried and recrystallized from nitrobenzene, whereby the dyestuff is obtained in the form of a greenish-black crystalline powder. It melts above 400° C., dissolves in concentrated sulfuric acid to an olive solution and dyes cotton in an orange brown vat olive green tints of good fastness.

Example 20

80 parts of benzidine, 37 parts of tetrachloropyrenequinone of melting point 338° C., a little very pure finely divided copper and 30 parts of potassium carbonate are mixed together and suspended in 500 parts by volume of tetrachlorethane. The temperature is now raised to 120–125° C. and stirring continued for 20 hours. The dark mixture is filtered and the solid matter washed; the latter constitutes the dyestuff, and, after drying, is in the form of a green-black powder which melts above 400° C. and dissolves in concentrated sulfuric acid to a green solution and dyes cotton in an orange-red vat olive black tints of good fastness to washing.

Example 21

37 parts of tetrachloropyrenequinone of melting point 362° C., 57 parts of 2-chloro-4-methyl-1-aminobenzene and a little very pure finely divided copper are together suspended in 300 parts by volume of trichlorobenzene and the suspension is stirred for 20 hours at a temperature of 120–125° C. When the reaction is finished the mass is filtered, the solid matter washed, dried and recrystallized from nitro-benzene. The dyestuff thus obtained is a brown-green powder which melts at 285–290° C. and dissolves in concentrated sulfuric acid to a brown to red-brown solution. In an orange-brown vat it dyes cotton yellow-olive tints.

What I claim is:—

1. In the manufacture of vat-dyestuffs the step which consists in causing halogenated pyrenequinones having a melting point above 330° C. to react with amines containing at the nitrogen atom at least one hydrogen atom capable of exchange.

2. In the manufacture of vat-dyestuffs the step which consists in causing tetra-halogenated pyrenequinones having a melting point above 330° C. to react with aromatic amines containing at the nitrogen atom at least one hydrogen atom capable of exchange.

3. In the manufacture of vat-dyestuffs the step which consists in causing tetra-chlorinated pyrenequinones having a melting point above 330° C. to react with aromatic amines of the naphthalene series containing at the nitrogen atom at least one hydrogen atom capable of exchange.

4. In the manufacture of vat-dyestuffs the step which consists in causing tetra-chlorinated pyrenequinones having a melting point above 330° C. to react with 2-aminonaphthalene.

5. In the manufacture of vat-dyestuffs the step which consists in causing tetra-chlorinated pyrenequinones having a melting point of 350 to 362° C. to react with 2-aminonaphthalene.

6. Process for the manufacture of vat-dyestuffs, consisting in causing halogenating agents to react in a first step with pyrenequinone, and, in a second step, causing the halogenated pyrenequinones of melting point above 330° C. to react with amines containing at the nitrogen atom at least one hydrogen atom capable of exchange.

7. Process for the manufacture of vat-dyestuffs, consisting in causing halogenating agents to react in a first step with pyrenequinone in presence of solvents, and, in a second step, causing the tetra-halogenated pyrenequinones of melting point above 330° C. to react with aromatic amines containing at the nitrogen atom at least one hydrogen atom capable of exchange.

8. Process for the manufacture of vat-dyestuffs, consisting in causing halogenating agents to react in a first step with pyrenequinone in presence of solvents and of halogen carriers, and, in a second step, causing the tetra-halogenated pyrenequinones of melting point above 330° C. to react with aromatic amines containing at the nitrogen atom at least one hydrogen atom capable of exchange.

9. Process for the manufacture of vat-dyestuffs, consisting in causing chlorinating agents to react in a first step with pyrenequinone in presence of solvents and of halogen carriers, and, in a second step, causing the tetra-chlorinated pyrenequinones of melting point above 330° C. to react with aromatic amines containing at the nitrogen atom at least one hydrogen atom capable of exchange.

10. Process for the manufacture of vat-dyestuffs, consisting in causing chlorinating agents to react in a first step with pyrenequinone in presence of solvents and of halogen carriers, and, in a second step, causing the tetra-chlorinated pyrenequinones of melting point above 330° C. to react with aromatic amines of the naphthalene series containing at the nitrogen atom at least one hydrogen atom capable of exchange.

11. Process for the manufacture of vat-dyestuffs, consisting in causing chlorinating agents to react in a first step with pyrenequinone in presence of solvents and of halogen carriers, and, in a second step, causing the tetrachlorinated pyrenequinones of melting point above 330° C. to react with 2-aminonaphthalene.

12. Process for the manufacture of vat-dyestuffs, consisting in causing chlorinating agents to react in a first step with pyrenequinone in presence of solvents and of halogen carriers, and, in a second step, causing the tetra-chlorinated pyrenequinones of melting point 350 to 362° C. to react with 2-aminonaphthalene.

13. Halogenated pyrenequinones of the general formula

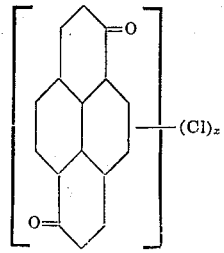

wherein $x$ stands for the numbers 1 to 4, which products melt above 330° C., and are converted by oxidative degradation into naphthalene-1:4:5:8-tetra-carboxylic acid.

14. Chlorinated pyrenequinones of the general formula

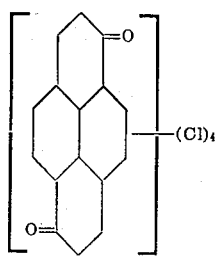

which products melt above 330° C. and are converted by oxidative degradation into naphthalene-1:4:5:8-tetra-carboxylic acid.

15. Chlorinated pyrenequinones of the general formula

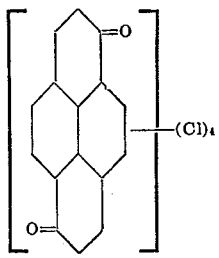

which products melt between 350 and 362° C.

16. Vat-dyestuffs obtained in a first step by the action of halogenating agents on pyrenequinone, and, in a second step, by the action of halogenated pyrenequinones of melting point above 330° C. on amines containing at the nitrogen atom at least one hydrogen atom capable of exchange.

17. Vat-dyestuffs obtained in a first step by the action of halogenating agents on pyrenequinone in the presence of solvents, and, in a second step, by the action of the tetra-halogenated pyrenequinones of melting point above 330° C. on aromatic amines containing at the nitrogen atom at least one hydrogen atom capable of exchange.

18. Vat-dyestuffs obtained in a first step by the action of halogenating agents on pyrenequinone in the presence of solvents and of halogen carriers, and, in a second step, by the action of the tetra-halogenated pyrenequinones of melting point above 330° C. on aromatic amines containing at the nitrogen atom at least one hydrogen atom capable of exchange.

19. Vat-dyestuffs obtained in a first step by the action of chlorinating agents on pyrenequinone in the presence of solvents and of halogen carriers, and, in a second step, by the action of the tetrachlorinated pyrenequinones of melting point above 330° C. on aromatic amines containing at the nitrogen atom at least one hydrogen atom capable of exchange.

20. Vat-dyestuffs obtained in a first step by the action of chlorinating agents on pyrenequinone in the presence of solvents and of halogen carriers, and, in a second step, by the action of the tetra-chlorinated pyrenequinones of melting point above 330° C. on aromatic amines of the naphthalene series containing at the nitrogen atom at least one hydrogen atom capable of exchange.

21. Vat-dyestuffs obtained in a first step by the action of chlorinating agents on pyrenequinone in the presence of solvents and of halogen carriers, and, in a second step, by the action of the tetra-chlorinated pyrenequinones of melting point above 330° C. on 2-aminonaphthalene.

22. Vat-dyestuffs obtained in a first step by the action of chlorinating agents on pyrenequinone in the presence of solvents and of halogen carriers, and, in a second step, by the action of the tetra-chlorinated pyrenequinones of melting point 350 to 362° C. on 2-aminonaphthalene.

WALTER KERN.